United States Patent Office 3,345,127
Patented Oct. 3, 1967

3,345,127
PROCESS FOR RECOVERING BORON VALUES FROM SCRAP MATERIALS
Allan R. Eberle and Morris W. Lerner, South Plainfield, and Louis J. Pinto, Bound Brook, N.J., assignors to the United States of America as represented by the United States Atomic Energy Commission
No Drawing. Filed July 6, 1964, Ser. No. 380,718
4 Claims. (Cl. 23—59)

ABSTRACT OF THE DISCLOSURE

This invention discloses a process of recovering boron-values from scrap material wherein boron is converted to boric acid by steam hydrolysis; the boric acid is reacted with potassium hydroxide to potassium borate, the potassium borate is reacted with hydrofluoric acid to produce $KBF_4$, thereafter the $KBF_4$ is precipitated from the reaction products by the addition of ethyl alcohol.

This invention is related to an economical efficient process for recovering boron in a highly purified state from boron containing scrap materials.

Elemental boron is used chiefly in the metal and nuclear industries. The presence of boron in alloy steels considerably increases the high temperature strength characteristics of these alloys. Elemental boron has found increased use in high temperature and atomic reactor technologies.

In combination with plastics or aluminum, boron provides an effective lightweight neutron shielding material. Boron containing shields are valuable because of their satisfactory mechanical properties and because boron absorbs neutrons without producing high energy X-rays. Rods and strips of boron steel have been used extensively as control rods in existing atomic reactors. Such uses require that the boron be present in a high state of purity.

Boron is not found in the free state in nature but occurs in the form of borates and boric acid.

The literature describes a variety of methods for the preparation of elemental boron from boron oxide, halides, hydrides and other boron-containing compounds. These methods involve electrothermic, electrochemical and direct pyrolysis procedures and may be classified as follows:

$$B_2O_3 + Mg \rightarrow 2B + 3MgO \quad (1)$$

alkali metal reduction of boron halides $$BCl_3 + 3Na \rightarrow B + 3NaCl \quad (2)$$

hydrogen reduction of the halides $$2BCl_3 + 3H_2 \rightarrow 2B + 6HCl \quad (3)$$

carbothermic reduction of borates $$Na_2B_4O_7 + 7C \rightarrow 2Na + 7CO + 4B \quad (4)$$

electrolysis of fused borates or other boron containing compounds $$2KBF_4 + 6KCl \rightarrow 2B + 8KF + 3Cl_2 \quad (5)$$

and thermal decomposition of boron hydrides $$B_2H_6 \rightarrow 2B + 3H_2 \quad (6)$$

Of these methods, Reactions 1, 3, and 5 are used on a commercial scale. While these methods in and of themselves are useful when the required starting material for the process is present none of them individually or collectively disclose a method for recovering boron from widely differentiated boron containing sources.

It is an object of this invention to provide those skilled in the art with an efficient relatively economical method of recovering boron in a highly purified state from boron containing materials such as scrap material.

Other objects of this invention will in part be obvious and will in part appear hereinafter.

We have discovered that the above and other objects of this invention can readily be attained by a process for recovering boron from boron containing scrap material comprising, heating the scrap material to a temperature ranging from between about 750° C. to about 1100° C.; contacting the heated scrap material with steam to hydrolyze the boron contained therein to boric acid; passing steam through the boric acid and collecting an aqueous condensate containing said boric acid, adding potassium hydroxide to the boric acid containing solution to convert the boric acid to potassium borate; adding hydrofluoric acid to the aqueous solution containing the potassium borate to convert the potassium borate to $KBF_4$; adding from about 80 percent to about 120 percent by volume of ethyl alcohol, based upon the volume of the aqueous solution, to the aqueous solution; and thereafter recovering the boron as $KBF_4$. The steps wherein boron is hydrolyzed to boric acid and wherein boric acid is recovered from the scrap material can be and is preferentially carried out as a single operation simply by adjusting the flow of steam through the scrap material to a rate in which boric acid is removed from the scrap material as rapidly as it is formed by the passage of steam through the material. This entails passing steam through the system as rapidly as possible, while maintaining the requisite temperatures in the system, in order to encourage as fast a recovery by distillation as is possible in the equipment utilized.

The amount of potassium hydroxide to be added to the system of course will be directly dependent upon the amount of boric acid contained in the aqueous condensate collected which acid is to be converted to potassium borate. For the sake of economy at least a stoichiometric amount should be employed and in the preferred embodiment of our invention we add potassium hydroxide pellets to the boric acid containing condensate until the pH of the condensate is about 10.4 for at this point we have found that substantially all boron contained in the condensate is converted to potassium borate. One may use an aqueous solution of potassium hydroxide in the production of the potassium borate, however, this will only increase the dilution of the resulting solution. In the preferred embodiment of our invention in order to increase the efficiency and economy of our invention, water is removed from the aqueous solution containing the potassium borate until the solution is saturated with potassium borate in order to prevent product loss due to solubility of $KBF_4$ in water.

The amount of hydrofluoric acid to be added to the aqueous solution of potassium borate should be sufficient to produce a pH in the aqueous solution ranging from about 5 to about 6. Care must be taken to avoid splattering when the hydrofluoric acid is added to the solution due to the corrosiveness of the acid. Approximately 2.55 times as much by weight of hydrofluoric acid as compared with the amount of potassium hydroxide previously added to the aqueous solution must be added to the aqueous solution containing potassium borate to convert all of the potassium borate to $KBF_4$. Methyl red (saturated alcoholic solution of methyl red indicator) is added to the solution; if the solution is yellow in color more hydrofluoric acid is added until the solution is orange-yellow in color; if the solution is red, more potassium hydroxide is added until the solution is orange-yellow in color. This pH adjustment can be made after the alcohol addition step described below.

After converting the potassium borate in the aqueous solution to $KBF_4$, sufficient ethyl alcohol is added to the solution in an amount such that the percentage of alcohol in the resulting mixture is at least 40% by volume ethyl alcohol and no more than 60% by volume ethyl alcohol. In the preferred embodiment of our invention we dilute the $KBF_4$ containing aqueous solution with an approximately equal amount by volume (98%) of ethyl alcohol. Upon the addition of the ethyl alcohol the $KBF_4$ precipitates completely out of the solution.

The $KBF_4$ crystals which precipitate out of the condensate after the fluorination and alcohol addition steps can readily be separated out of the solution and recovered by any conventional means such as filtration, centrifugation and decantation etc. Small quantities of solid material along with any small amounts of precipitated hydroxides are removed by filtration after the addition of potassium hydroxide before evaporation.

The boron containing scrap material found usable in our invention can be elemental boron, boron carbide or any other boron containing compound and mixtures of these compounds. Scrap in the form of a mixture or enclosed by combustible organic material such as polyethylene tape impregnated with boron carbide is preferentially burned to an ash to remove any combustible materials contained therein. In the preferred embodiment of our invention, the scrap material is crushed to the form of a fine powder in order to facilitate the conversion of the boron contained therein to boric acid during the hydrolytic portion of our novel process. The boron in the scrap material found usable in our invention can range from a few parts per million to 100 percent boron. Scrap material that has been leached with acid, to recover silver values, for example, should be washed thoroughly with water and dried before being treated in our novel process.

The temperature to be employed during the hydrolysis portion of our novel invention can range from about 750° C. to about 1100° C. and in the preferred embodiment of our invention we employ a temperature of about 950° C. When lower temperatures are employed a slower rate of hydrolysis is achieved and at temperatures below 750° C. the rates are so low as to render the process uneconomical. When elemental boron is present in the scrap material lower temperatures within our working range are preferably employed in order to minimize corrosion damage to the equipment.

The rate of flow of steam during the steam distillation portion of our novel process is not critical. However, when the flow rate is too high it is difficult to maintain the required temperature ranges in the reaction vessel. The rate of recovery of boric acid from the reaction vessel is nearly constant but with increased amounts of distillate more boron is recovered.

The hydrolysis of boron contained in scrap material to boric acid can be carried out in any suitable reaction vessel where the requisite heat and steam can be applied to the material. Preferentially it should be carried out in a vessel wherein steam can be passed through and collected after the actual hydrolysis has occurred in order that the hydrolysis and steam distillation can be carried out in the same overall apparatus. The reaction vessel in which the hydrolysis is carried out should be composed of material such as nickel, gold, etc. that has a high resistance to corrosion inherent in boron at the temperatures employed in our invention. When elemental boron is present in the scrap material it is recommended that the material be separated from the vessel walls by a layer of highly inert material such as aluminum oxide particles.

Any fused boric acid produced in the reaction vessel during the hydrolysis portion of our invention can be leached off with boiling water but an impure aqueous solution of boric acid will be obtained from which the boron can be recovered by treating the aqueous solution resulting from the leaching in the same manner that the aqueous condensates resulting from the hydrolysis portion of our novel invention are treated. However, in the event that a highly purified product is desired, recovery of the boric oxides by leaching is not desirable due to the fact that many impurities would also be leached out of the scrap material with the boric acid. Thus steps should be taken to limit the production of boric oxides during the hydrolysis step of our invention such as providing sufficient steam and adequate temperatures to the scrap material to insure complete hydrolysis of the boron contained therein to boric acid.

EXAMPLE I

*Apparatus*

A reaction vessel consisting of a nickel tube 18 inches in length, having an outside diameter of 4½ inches and a thickness of ¼ inch was employed to carry out the hydrolysis portion of our invention in this example. The tube had a flanged opening at one end sealed with a copper gasket with a thermocouple well and steam inlet tube being connected to the inside of the vessel through this flanged end. The other end of the vessel led to a stainless steel copper jacketed condenser coil having an inside diameter of 5/16 inch and a length of 36 inches. The coils copper jacket for water cooling had an inside diameter of 5 inches with a length of 10 inches.

During operation of the apparatus laboratory steam was led into 12 liter, 3 neck flask (round bottom) that was heated by a mantle controlled by two variacs, and the steam was then led into the reaction vessel. The flask served both as a water trap and an emergency steam generator. The reaction vessel was heated in a 19 inch long wire wound furnace with 220 volts and 18 amperes capable of reaching 1000° C. in one hour. The thermocouple leads were brought into the pyrometer and temperature controlling unit of a Burrel muffle furnace. The condenser unit and receiving unit thereof were held in a hood because of the large volume of hydrogen, carbon monoxide and carbon dioxide given off in the reaction.

Two sample trays made of ⅛ inch thick sheet nickel 9 inches long having ¾ inch high sides with width such that the two trays were positioned one over the other with nickel strap spacers placed between the trays were utilized to hold the scrap materials from which the boron was to be recovered by our novel process.

*Procedure*

A sample of powdered scrap material having a particle size of 20 mesh or finer was spread out evenly on the trays and the trays were placed in the reaction vessel. The reaction vessel temperature was gradually raised to about 950° C. The steam flow was stated when the vessel reached about 600° C. The steam flow rate was maintained at about 5 liters of condensate per hour. The condensate in about 6 liter batches was collected in stainless steel beakers. The pH of the batches was adjusted to 10.4 by the addition of potassium hydroxide pellets to the batches. After pH adjustment the batches for each run were combined and evaporated to a volume of about 2 liters and this solution was then filtered through a Buchner funnel fitted with a Whatman No. 42 paper and the filtrate transferred to a 4 gallon polypropylene vat.

The filtrate was cooled in an ice bath and 2.55 ml. of 49% hydrofluoric acid per gram of potassium hydroxide was slowly added to the filtrate. The mixture was cooled to room temperature and diluted with an equal amount of 95% ethyl alcohol and stirred. Ten milliliters of a saturated alcoholic solution of method red indicator was added to the solution and sufficient potassium hydroxide was added to the solution to reach the orange-yellow color of the indicator; pH 5.5 to 6.0. After 15 minutes, the potassium fluoborate ($KBF_4$) solute was recovered by passing the solution through a No. 41 Whatman filter paper fitted on a Buchner funnel. The solute product ($KBF_4$) was washed with two 300 ml. portions of 50% ethyl alcohol then with a 200 ml. portion of 95% ethyl alcohol.

In this example a quantity of plastic hollow discs containing chiefly boron carbide was employed as the scrap material. The discs were burned off and the residue was ignited in a furnace at 600° C. for two hours. The material was then crushed and passed through a 20-mesh screen. 712 grams of this powder was employed in the entire run. Upon analysis the material was shown to contain 79.17 weight percent boron and 91.15 weight percent boron-10 (M.W.=10.093). The theoretical yield of $KBF_4$ obtained from this weight of boron, 563.7 grams is 6992 grams; the recovered weight was 6894 grams or a yield of 98.6 percent of $KBF_4$ that had a purity of 99.4%.

The run was carried out as follows:

*First day.*—220 grams of scrap material was hydrolyzed in the two trays and 341 grams of potassium hydroxide were used to adjust the pH of the condensate to 10.4.

*Second day.*—100 grams of scrap material were added to the ash remaining in the sample trays from the first day and the mixture was hydrolyzed. 433 grams of potassium hydroxide were used to adjust the pH of the condensate on the second day to 10.4. The boron contained in the condensates produced on the first and second days were worked up in accordance with the procedure given above using 1975 ml. of 49 percent hydrofluoric acid and 1582 grams of $KBF_4$ were obtained.

*Third day.*—100 grams of scrap material were added to the residues in the tray and 418 grams of potassium hydroxide were used to adjust the pH of the condensate to 10.4.

*Fourth day.*—100 grams of scrap material were added to the ash remaining in the trays and 417 grams of potassium hydroxide were used to adjust the pH of the condensate to 10.4. The boron contained in the condensates produced on the third and fourth days were worked up in accordance with the procedure given above using 2130 ml. of 49% hydrofluoric acid and 1750 grams of $KBF_4$ were obtained.

*Fifth day.*—The balance of 44 grams of scrap material was added to the residue of the previous batches in the tray and 422 grams of potassium hydroxide were used to adjust the pH of the concentrate to 10.4.

*Sixth day.*—Heating and steam distillation of tray residues continued and 243 grams of potassium hydroxide were used to adjust the pH of the condensate to 10.4.

*Seventh day.*—Heating and steam distillation of tray residues continued and 229 grams of potassium hydroxide were used to adjust the pH of the condensate to 10.4. The boron contained in the condensation produced on the fifth, sixth and seventh days was worked up in accordance with the procedure given above using 2280 ml. of 49% hydrofluoric acid and 1838 grams of $KBF_4$ were recovered.

*Eighth day.*—Residue remaining in the trays was leached with hot water and filtered on a Whatman No. 42 paper. 300 grams of potassium hydroxide were added to the filtrate to adjust the pH to 10.4. The solute remaining was hydrolyzed by heat and steam in the manner described above. 307 grams of potassium hydroxide were used to adjust the pH of the condensate collected on the eighth day to 10.4.

*Ninth day.*—Heating and distillation of the solute in the trays was continued until boric acid ceased forming part of the condensate. 113 grams of potassium hydroxide were added to adjust the pH of the condensate to 10.4. The boron contained in the filtrate and condensation produced on the eighth and ninth days was worked up in accordance with the procedure given above using 1910 ml. of 49% hydrofluoric acid and 1724 grams of $KBF_4$ were recovered.

From the above example it is obvious that our invention provides a highly efficient relatively economic method of recovering boron in a pure state from boron containing scrap materials. Further, our invention is readily adaptable for use as either a batch type or continuous type recovery process. An added advantage gained by use of our novel process is that radioactive scrap material containing uranium can be decontaminated simultaneously with boron recovery as all of the radioactive materials remain in the ash produced during the hydrolysis portion of our process. In view of the contemplated widespread use of boron in the nuclear field this latter advantage is deemed to be of significant importance.

We claim:
1. A process for recovering boron values from boron containing scrap material comprising,
   (a) heating the scrap material to a temperature ranging from about 750° C. to about 1100° C.;
   (b) contacting the heated scrap material with steam to hydrolyze the boron contained therein to boric acid;
   (c) passing steam through the boric acid and collecting a solution containing said boric acid;
   (d) adding potassium hydroxide to the boric acid containing aqueous solution to convert the boric acid to potassium borate;
   (e) adding hydrofluoric acid to the aqueous solution containing potassium borate to adjust the pH of the solution to a value ranging from about 5 to about 6;
   (f) adding from about 80 percent to about 120 percent by volume of ethyl alcohol, based upon the volume of the aqueous solution, to the aqueous solution whereby $KBF_4$ precipitates;
   (g) thereafter recovering the $KBF_4$.

2. The process of claim 1 wherein said scrap material is heated to 950° C.

3. The process of claim 2 wherein sufficient potassium hydroxide is added to the boric acid containing aqueous solution until the pH of the solution is approximately 10.4.

4. The process of claim 3 wherein about 98 percent by volume of ethyl alcohol, based upon the volume of the aqueous solution, is added to the aqueous solution.

References Cited

UNITED STATES PATENTS

| 1,685,214 | 9/1928 | Cramer | 23—59 |
| 3,290,113 | 12/1966 | Harel et al. | 23—59 |

FOREIGN PATENTS

| 117,372 | 1959 | Russia. |

OSCAR R. VERTIZ, *Primary Examiner.*

H. T. CARTER, *Assistant Examiner.*